(12) United States Patent
Arnold et al.

(10) Patent No.: US 8,514,195 B2
(45) Date of Patent: Aug. 20, 2013

(54) SELF-HEALING AND DIAGNOSTIC SCREEN

(75) Inventors: Nicole M. Arnold, Cary, NC (US);
Lydia M. Do, Research Triangle Park, NC (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/474,449

(22) Filed: May 17, 2012

(65) Prior Publication Data

US 2012/0223904 A1    Sep. 6, 2012

Related U.S. Application Data

(62) Division of application No. 11/962,346, filed on Dec. 21, 2007.

(51) Int. Cl.
*G06F 3/041*    (2006.01)

(52) U.S. Cl.
USPC ...... 345/173; 345/183; 178/19.01; 178/20.01

(58) Field of Classification Search
USPC .................................. 345/173–184
See application file for complete search history.

(56) References Cited

U.S. PATENT DOCUMENTS

| | | | | |
|---|---|---|---|---|
| 4,992,779 A | * | 2/1991 | Sugino et al. | 345/173 |
| 5,526,422 A | * | 6/1996 | Keen | 379/396 |
| 7,804,307 B1 | * | 9/2010 | Bokma et al. | 324/663 |
| 2003/0167289 A1 | * | 9/2003 | Rhodes | 708/200 |
| 2005/0285557 A1 | * | 12/2005 | Morishita | 318/444 |

OTHER PUBLICATIONS

Arnold et al., U.S. Appl. No. 11/962,346, Final Office Action dated Jan. 6, 2012.
Arnold et al., U.S. Appl. No. 11/962,346, Final Office Action dated Sep. 6, 2011.
Arnold et al., U.S. Appl. No. 11/962,346, Non-Final Office Action dated Feb. 2, 2011.
Arnold et al., U.S. Appl. No. 11/962,346, Restriction Requirement dated Nov. 16, 2010.

* cited by examiner

*Primary Examiner* — Amare Mengistu
*Assistant Examiner* — Vinh Lam
(74) *Attorney, Agent, or Firm* — Yudell Isidore Ng Russell PLLC

(57) ABSTRACT

A method, system, and computer program product for determining a level of cleanliness of a multi-touch screen display, characterizing objects that make contact with the screen, and initiating a specific maintenance action on the screen, based on screen cleanliness and the object(s) characterization(s). A screen diagnostic and maintenance (SDM) utility initiates a number of procedures to determine the type of object(s) and a set of characteristics of object(s) that make contact with the touch screen. Based on the results of the procedures, the SDM utility characterizes/identifies the object(s). In addition, the SDM utility initiates maintenance screen check(s) based on information stored in maintenance configuration file(s). Based on the results of the maintenance check(s), configuration file(s) data and type and characterization of the object(s) that have made contact with the screen, the SDM utility determines the type of maintenance that is performed and the timing/schedule of the maintenance action(s).

8 Claims, 4 Drawing Sheets

SELF-HEALING AND DIAGNOSTIC SCREEN

CROSS-REFERENCE TO RELATED APPLICATION

The present application claims priority under 35 U.S.C. §120 as a divisional application to application Ser. No. 11/962,346, entitled "SELF-HEALING AND DIAGNOSTIC SCREEN," filed on Dec. 21, 2007, which is hereby incorporated by reference in its entirety.

BACKGROUND

1. Technical Field

The present invention generally relates to data processing systems and in particular to touch screen displays in data processing systems.

2. Description of the Related Art

Touch screen displays have been increasing in popularity in recent years. Touch screens provide users with a convenient and efficient way to interact with a computer system. However, in order to maintain the level of convenience, efficiency, and even safety, maintaining the cleanliness of the touch screen is an important issue. There is some existing technology that provides a solution for the maintenance of the touch screen. A few solutions focus on maintaining the level of cleanliness based on the number of times a human makes contact with the screen. Other solutions utilize a measurement of the screen's opacity level to determine whether maintenance/cleaning is required. In addition, the maintenance action provided by some of the current solutions relies on the fixed action of a maintenance facility (i.e., a protection mechanism) that is integrated into the touch screen device. The current solutions place no particular focus on: (a) the detection of multiple inputs or objects coming into contact with a touch screen; or (b) the discernment of the type of inputs or objects; or (c) the type of maintenance actions needed in the particular type of environment.

SUMMARY OF ILLUSTRATIVE EMBODIMENTS

Disclosed are a method, system, and computer program product for determining a level of cleanliness of a touch screen display, characterizing an object that makes contact with the screen, and initiating a specific maintenance action on the screen of a computer system, based on screen cleanliness and the object characterization. A screen diagnostic and maintenance (SDM) utility initiates a number of procedures to determine a set of characteristics of an object(s) that makes contact with the touch screen. Based on the results of the procedures, the SDM utility is able to characterize/identify the object. In addition, the SDM utility initiates the maintenance screen check(s) based on information stored in a maintenance configuration file(s). Based on the results of the maintenance check(s), data from the configuration file(s), and characterization of the object(s) which have made contact with the screen, the SDM utility determines the type of maintenance that is performed and the schedule of the maintenance action.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
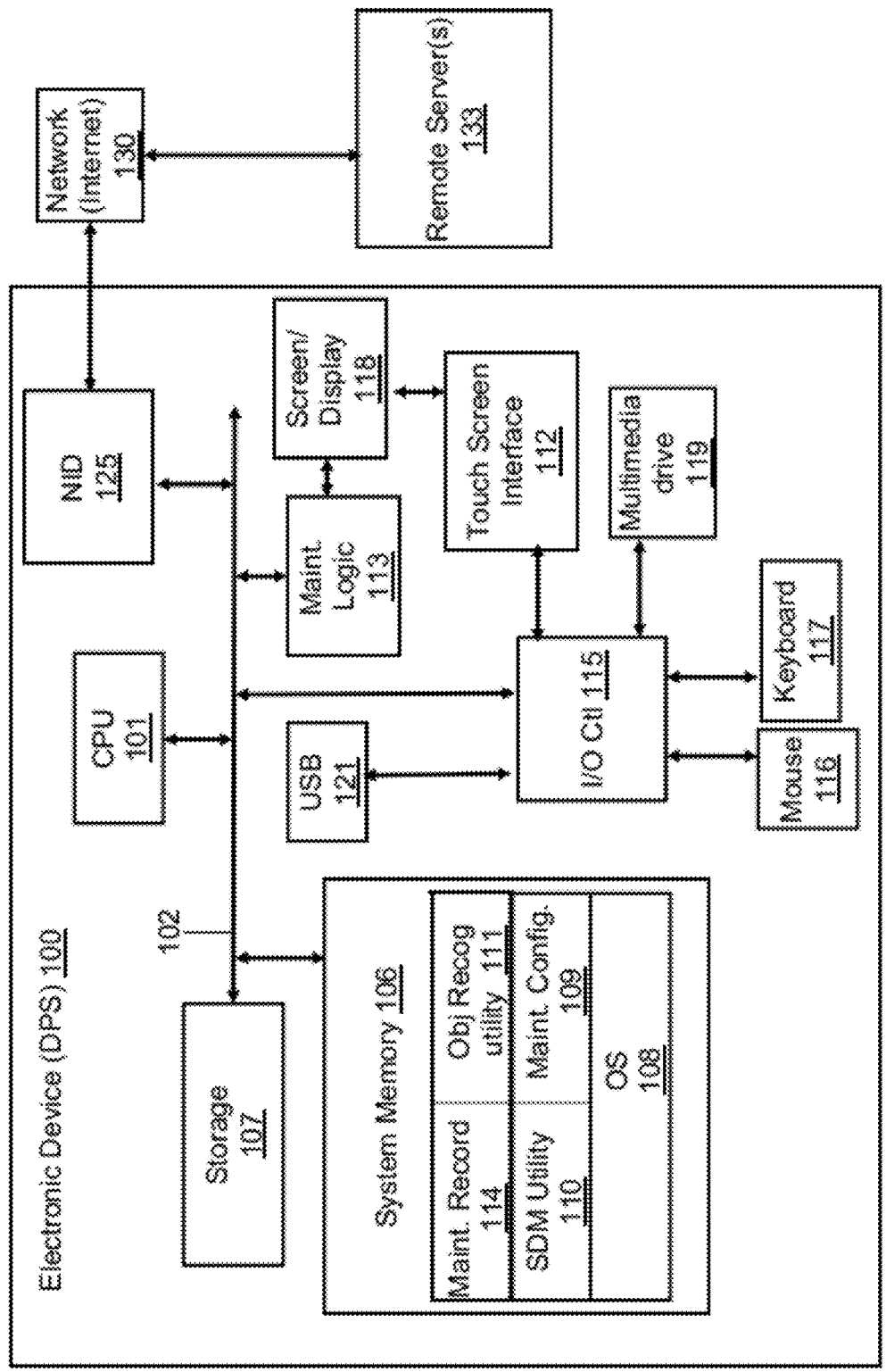
FIG. 1 is a block diagram representation of an electronic device configured with a multi-touch screen, according to one embodiment of the invention.

The illustrative embodiments provide a method, system, and computer program product for determining a level of cleanliness of a touch screen display, characterizing an object that makes contact with the screen, and initiating a specific maintenance action on the screen of a computer system, based on screen cleanliness and the object characterization. A screen diagnostic and maintenance (SDM) utility initiates a number of procedures to determine a set of characteristics of an object(s) that makes contact with the touch screen. Based on the results of the procedures, the SDM utility is able to characterize/identify the object. In addition, the SDM utility initiates the maintenance screen check(s) based on information stored in a maintenance configuration file(s). Based on the results of the maintenance check(s), data from the configuration file(s) and characterization of the object(s) which have made contact with the screen, the SDM utility determines the type of maintenance that is performed and the schedule of the maintenance action.

Implementation of the embodiments enables enhanced functionality for maintenance actions involving a touch screen display by: (1) allowing multiple input resolution; (2) allowing discernment of the various input; (3) allowing for fine granularity of maintenance actions; and (4) scheduling the maintenance actions to allow for some level of autonomy for the user. Additionally, the described maintenance actions (5) do not require that the detection and maintenance mechanisms be tightly coupled and integrated directly into the body of the device (as provided with a kiosk, for example).

In the following detailed description of exemplary embodiments of the invention, specific exemplary embodiments in which the invention may be practiced are described in sufficient details to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, there is depicted a block diagram representation of an electronic device (which is illustrated as, but not limited to data processing system) configured with a multi-detection visual display screen (touch screen). Electronic device 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated. I/O controller 115 is also connected to touch screen interface 112 which is connected to input/output touch display 118. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. Electronic device 100 also comprises storage 107, within which data/instructions/code may be stored. Electronic device 100 further comprises maintenance logic 113 which provides a number of maintenance notifications, including one or more or a combination of the following: (1) a visual highlighting notification, which involves a visual change in the area (i.e., various grades of lighting or dimming); (2) a sound notification, such as an audio alert; (3) a sensory notification, which may include a complete usage restriction of the screen area; (4) a temperature notification/alert, whereby the area heats up or cools down, for example; and (5) a resolution resizing around the defective area. It is appreciated that the above list is not meant to imply any limitations on the type of notification that may be executed/implemented.

Electronic device 100 is also illustrated with a network interface device (NID) 125, with which electronic device 100 connects to one or more servers 133 via access network 130, such as the Internet. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of electronic device 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, GNU®/Linux®, registered trademarks of the Free Software Foundation and Linus Torvalds, or AIX®, a registered trademark of IBM), maintenance configuration (file) 109, maintenance records (file) 114, Object Recognition Facility 111, and screen diagnostic and maintenance (SDM) utility 110. In actual implementation, maintenance configuration (file) 109, maintenance records (file) 114, Object Recognition Facility 111, and SDM utility 110 may be combined as a single application collectively providing the various functions of each individual software component when the corresponding code is executed by the CPU 101. For simplicity, SDM utility 110 is illustrated and described as a stand alone or separate software/firmware component, which provides specific functions, as described below.

CPU 101 executes SDM utility 110 as well as OS 108, which supports the user interface features of SDM utility 110. In the illustrative embodiment, SDM utility 110 generates/provides several graphical user interfaces (GUI) to enable user interaction with, or manipulation of, the functional features of the utility (110). Among the software code/instructions provided by SDM utility 110, and which are specific to the invention, are: (a) code for detecting an occurrence of an object making contact with a touch screen display of a computer system; (b) code for characterizing/identifying the object that makes contact with the screen; and (c) code for initiating a specific maintenance action on the screen of the computer system. For simplicity of the description, the collective body of code that enables these various features is referred to herein as SDM utility 110. According to the illustrative embodiment, when CPU 101 executes SDM utility 110, electronic device 100 initiates a series of functional processes that enable the above functional features as well as additional features/functionality, which are described below within the description of FIGS. 2-3.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

In electronic device 100, SDM utility 110 detects contact from an object at touch screen display 118. SDM utility 110 characterizes the object to determine whether a maintenance action is required. Object recognition technology may be used to facilitate a characterization of the object. The characterization of the object is important since contact with certain objects may make touch screen 118 unusable. The types of objects making contact with the touch screen may take various forms which may include the following non-exhaustive list: (1) finger(s); (2) hand(s); (3) paper; (4) mist from the breath of a human being; (5) liquid; and (6) food. Sometimes multiple occurrences of contact by a particular object (e.g., a user's hands/fingers) with the touch screen are required to activate a maintenance action. However, a single occurrence of contact by another object (e.g., liquid) with the touch screen may be enough to activate a maintenance notification and/or action. For example, a drink/liquid spilling (see FIG. 2B) on touch screen 118 may create a greater level of urgency (i.e., may be assigned a higher level of maintenance priority) than bread crumbs coming into contact with touch screen 118. Furthermore, in this case, perhaps only one occurrence of a contact of this nature may be required to initiate a maintenance action. Thus, SDM utility 110 characterizes and distinguishes various types of object contact. SDM utility 110 refers to configuration record(s) 109 to determine the type of maintenance action required and the schedule of the action.

For example, in the case of an object characterized as a "liquid spill", the maintenance action may be to "clean the entire touch screen surface" and the schedule may be "immediately".

In electronic device 100, the maintenance notification (and/or maintenance action) may take various forms. As utilized herein the term notification and action may refer to a same activity or different activity of the SDM utility 110. That is, a notification may be considered an action, and vice versa, while some actions are not notifications. For simplicity, the term "maintenance action" is used to represent both a notification and an action taken by the SDM utility 110. In particular, the maintenance action may be a combination of any of the following and may not be limited to: (1) a visual change in the area (i.e., various grades of lighting or dimming); (2) an audio alert; (3) a complete usage restriction of the screen area; (4) a temperature alert (i.e. the area heats up or cools down); and (5) a resolution resizing around the defective area. Multiple usage of the screen increases the likelihood for maintenance due to normal wear-and-tear and also creates a risk factor for germs/infection. Upon detection that the area of the screen is unclean as determined by a preset threshold level of cleanliness, the computer cross-references the user's priority setting for a cleaning action. A cleaning action may not be scheduled based on a number of factors which may include priority, time of day, etc.

SDM utility 110 may initiate maintenance action in the form of a screen protection mechanism. This mechanism may be executed by the computer based on certain configurable conditions. To avoid integration of this mechanism within the touch screen surface, SDM utility 110 may initiate communication with the protection mechanism via blue-tooth capability. Blue-tooth capability enables communication between the protection mechanism device and the computer in order to provide location details of the affected area to the protection mechanism device. SDM utility 110 may allow the protection mechanism to be applied to the full surface area. Alternatively, SDM utility 110 may indicate that a layered/sectional screen protection to specific areas is desired. The screen protection mechanism may include the following: (1) a transparent film to be applied to or removed from the surface; and (2) a wiper mechanism that dispenses cleaning material across the surface.

SDM utility 110 may employ an interaction or idleness level as a cue for scheduling a maintenance action on the screen surface. Based on the level of interaction or idleness, a time of day, ambient light or movement around the screen surface, a maintenance cycle may be initiated/scheduled.

Figure 2A:
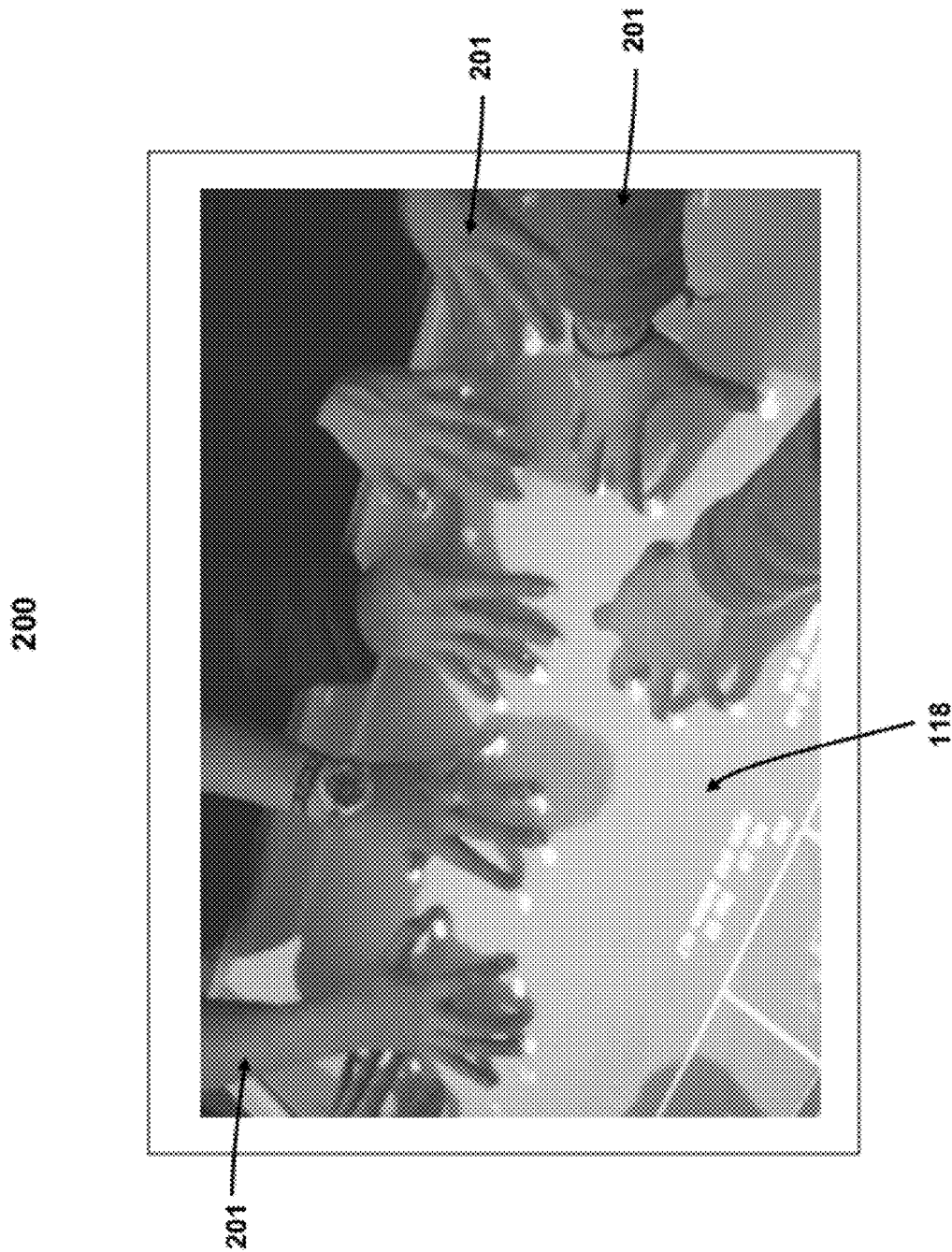
FIG. 2A illustrates a multi-detection touch screen display with interacting user(s), according to one embodiment of the invention.

FIG. 2A illustrates a touch screen display with multiple interacting users, according to one embodiment of the invention. Object-screen system 200 comprises touch screen display 118 with interacting user(s)/object(s) 201. In object-screen system 200, SDM utility 110 is capable of characterizing/identifying the object as a finger/hand. SDM utility 110 may further characterize "surface" characteristics of the object, such that a finger with grease is characterized differently from one with sweat (e.g., a sweaty or moist hand/finger). SDM utility 110 is able to distinguish between various types of contact in order to determine scheduling based on a configured priority and to select the most appropriate maintenance action. In one embodiment, for example, SDM utility 110 may employ Object Recognition Facility 111 to facilitate the characterization of object 201.

Figure 2B:
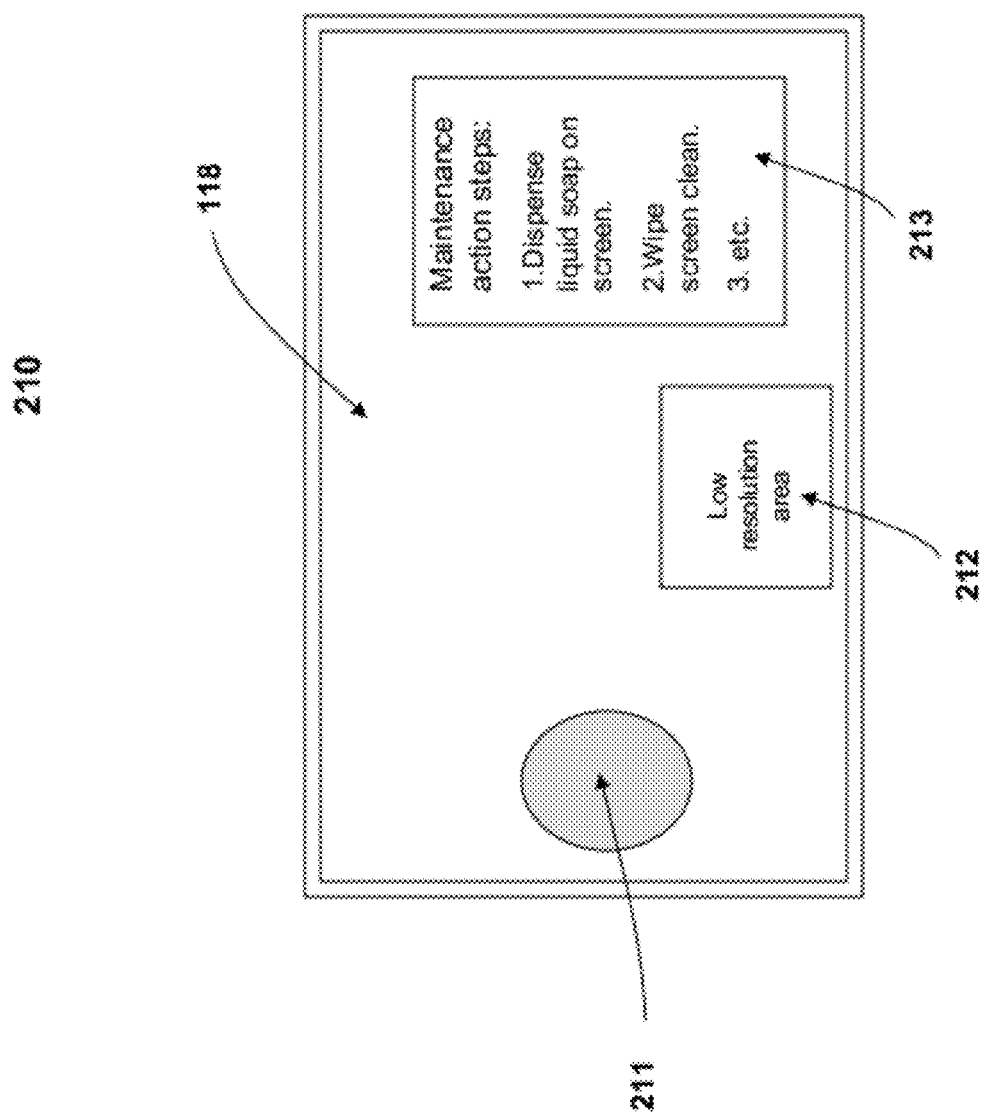
FIG. 2B is a block diagram of a multi-detection touch screen illustrating various factors affecting the level of cleanliness of the screen and an example list of steps provided to resolve a maintenance issue, according to one embodiment of the invention.

FIG. 2B is a block diagram of a multi-detection touch screen illustrating factors affecting the level of cleanliness of the screen and an example list of steps provided by SDM utility 110 to assist a user in resolving a screen maintenance issue, according to embodiments of the invention. Screen example 210 comprises touch screen 118. Disposed on touch screen 118 is liquid spill 211. A low pixel resolution area 212 of visual display on touch screen 118 is also illustrated. As provided within screen example 210, low resolution area 212 illustrates a section of the touch screen where clarity has been reduced. Additionally, a list with cleaning steps illustrated as maintenance list 213 is displayed on touch screen 218.

One application of low pixel resolution area 212 involves SDM utility 110 triggering an adjustment to the brightness, contrast, or degradation of screen resolution (bits per pixel) in an affected screen area. For example, with continual usage of the screen, SDM utility 110 may allow the area to continually change (degrade) in clarity. Thus, SDM utility 110 provides a visual indication of the level of dirtiness of that area of the screen 118, and responds by causing the area of the screen 118 to partially lose clarity. In extreme situations, SDM utility 118 may fully restrict visual display at a portion of the screen.

SDM utility 110 may alert the user to a possible problem (e.g., defective pixels, opaque/unclean section of the screen) with the surface screen via a constant indicator on or around the area affected. The constant indicator may include: (1) a visual effect such as highlighting or a display of icons, or arrows, on the screen; (2) a touch sensory mechanism by which the affected area becomes warmer or cooler to the touch; and (3) an audio sensory mechanism in which a sound becomes louder when a user/object gets within a certain proximity of the affected area.

SDM utility 110 may discover that pixels on the screen may be defective, after a maintenance action, for example. Consequently, SDM utility 110 may initiate a maintenance cycle to determine whether the pixel is actually "stuck" versus "dead" and then initiate the appropriate fix. As a maintenance action, SDM utility 110 may also provide temporary low resolution (212) of visual display on touch screen 118.

Figure 3:
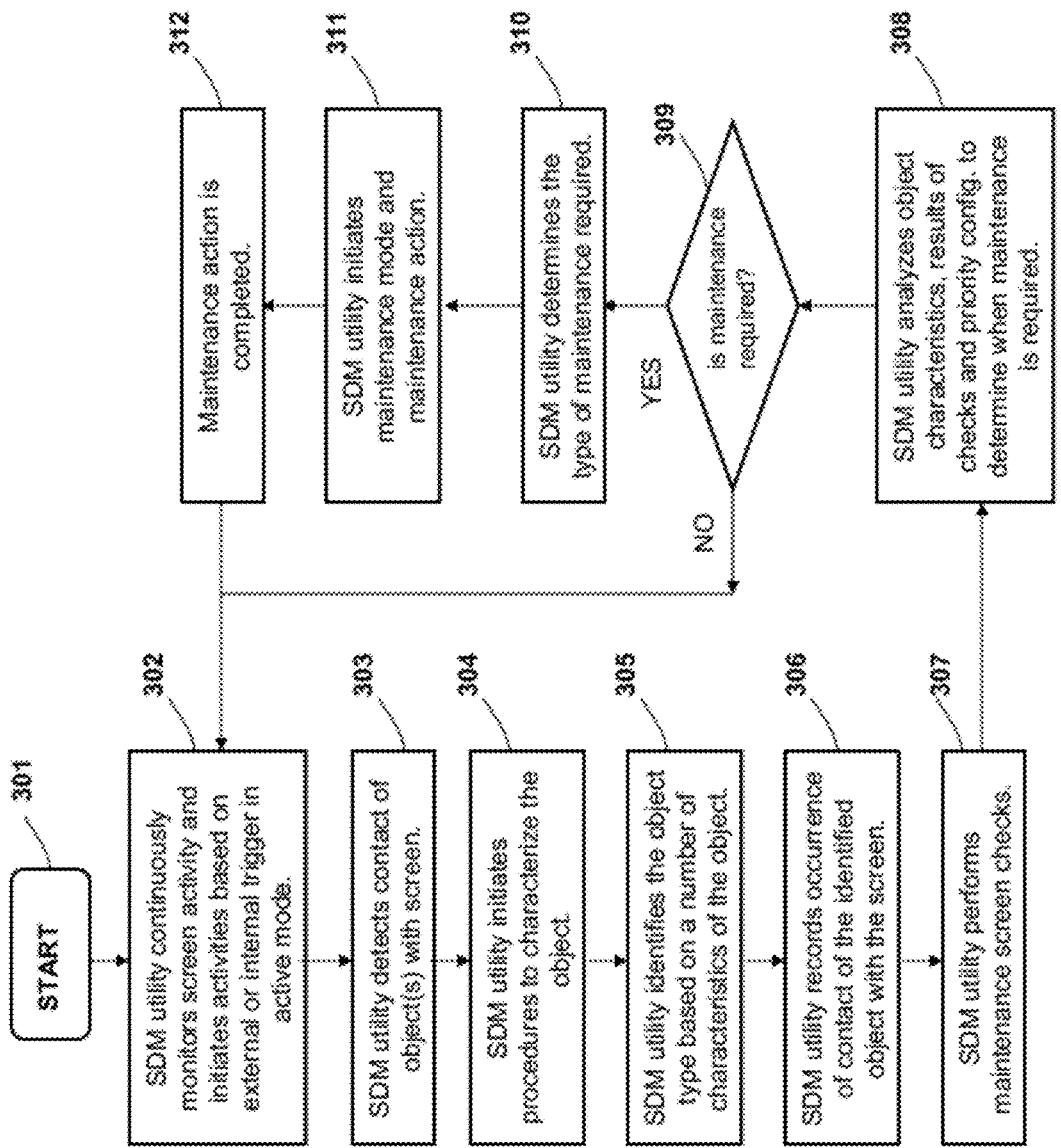
FIG. 3 is a flow chart illustrating the process of characterizing object contact with a touch screen and determining the appropriate maintenance action, according to one embodiment of the invention.

FIG. 3 is a flow chart illustrating a method by which the above processes of the illustrative embodiments are completed. Although the method illustrated in FIG. 3 may be described with reference to components shown in FIGS. 1-2, it should be understood that this is merely for convenience and alternative components and/or configurations thereof can be employed when implementing the various methods. Key portions of the methods may be completed by SDM utility 110 executing within electronic device 100 (FIG. 1) and controlling specific operations of/on electronic device 100, and the methods are thus described from the perspective of either/both SDM utility 110 and the multi-touch screen (118).

The process of FIG. 3 begins at initiator block 301 and proceeds to block 302, at which SDM utility 110 initiates an active mode. SDM utility 110 continuously monitors screen activity and initiates activities based on an external trigger (e.g., human contact) or internal triggers as a result of a pre-determined configuration. Furthermore, all user and computer system interaction via a touch screen proceeds without interruption by SDM utility 110.

At block 303, SDM utility 110 detects contact of an object (s) with the touch screen. SDM utility 110 initiates procedures to characterize the object, as shown at block 304. These procedures which reveal the properties of the object may include a number of the following: (1) a weight measurement; (2) a temperature measurement; (3) a location of the object; (4) an opacity level of the object; (5) further procedures (which may generate visual images/photographs of objects coming into contact with the touch screen, for example) to obtain data as inputs to an object recognition facility; and (6) multiple applications of the (measurement) procedures at various intervals in order to record changes in the object's properties over time. At block 305, SDM utility 110 identifies/characterizes the object based on the procedures to obtain the object characteristics. SDM utility 110 may determine whether the object is a liquid or a solid, for example, based on an identification of a set of properties of the object. The identification of the physical state may require multiple executions of a number of the preceding procedures. For example, a first measurement taken at one time interval and a second measurement taken subsequently may reveal the dynamic nature of a liquid, the location of which may change/expand as the liquid spreads across the touch screen. In addition, SDM utility 110 may be able to predict the manner in which the liquid spreads across the screen based on a computed viscosity of the liquid (obtained via the procedures/measurements).

At block 306, SDM utility 110 records, in a maintenance results file in the computer system, the occurrence of the contact of the characterized/identified object with the touch screen. Thus, SDM utility 110 is able to track a particular type of occurrence of object contact and provide a determination of the ability of the contact by the object with the touch screen to affect the level of screen cleanliness, based on the object characterization.

In addition to the measurement/maintenance procedures initiated by an external trigger, at a preset time period(s), SDM utility 110 initiates a number of maintenance screen checks, as shown at block 307. The timing of the maintenance checks are preset by configuration settings in a stored maintenance configuration file. The maintenance screen checks may be executed to determine a cleanliness level of the screen. A level of cleanliness may be determined by a reading (s) obtained via opacity sensors. The results of the maintenance checks are also recorded in the results file.

At block 308, SDM utility 110 performs an analysis to determine whether a maintenance action on the touch screen is required by utilizing a number of the following: (1) object characterization; (2) maintenance check results; and (3) maintenance configuration file(s). The object characterization and the maintenance check results may be stored in the maintenance results file(s). At decision block 309, SDM utility 110 determines whether a maintenance action(s) is required, based on the analysis results. If, at block 309, SDM utility 110 determines that a maintenance action(s) is required, the process moves to block 310, at which SDM utility 110 determines the specific type of maintenance action (s) required based on the configuration file(s) and/or maintenance results file. At block 311, SDM utility 110 enters a maintenance mode and initiates a specific maintenance action. In one embodiment, list 213 may be displayed on the visual display touch screen to provide a maintenance staff/user with a list of steps for completing maintenance action(s).

The maintenance action may take various forms and may be a combination of a number of other maintenance actions. These maintenance actions are outlined in the description of the figures. Once the maintenance action is completed, as shown at block 312, active mode resumes (i.e., the system returns to the normal state of operation), and the process returns to block 302 for continuous monitoring.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a nonexclusive list of types of media includes recordable type (tangible) media such as floppy disks, thumb drives, hard disk drives, CD ROMs, DVDs, and transmission type media such as digital and analog communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An electronic device comprising:
    a processor;
    a memory system coupled to the processor and which stores one or more of a maintenance configuration file, a maintenance records file, and an object recognition facility that facilitates characterization of objects;

a multiple detection touch screen;
a screen maintenance facility executing on the process and which provides a number of maintenance actions, including one or more of: (1) a visual highlighting notification; (2) a sound notification; and (3) a sensory and temperature notification;
a screen diagnostic and maintenance (SDM) utility which when executed by the processor enables the electronic device to:
  detect an occurrence of a contact by the object with the touch screen;
  automatically determine a set of characteristics of the object following the occurrence of the contact with the touch screen;
  dynamically activate a set of maintenance actions to enhance a level of cleanliness of the touch screen, wherein said activating further comprises triggering the set of maintenance actions as a result of one or more of: (1) a characteristic of a detected object (2) a threshold level attained following the occurrence of the contact, wherein said threshold is based on a number of factors contained within a maintenance configuration file; (3) an elapsed time interval since a last maintenance action; (4) an identified level of screen cleanliness that is determined by one or more procedures, including utilization of opacity sensors; (5) a time of day; (6) a level of interaction between a user and the touch screen; and (7) a set of configuration data;
  apply the set of maintenance actions, including one or more of: (1) a visual change in a particular screen location; (2) an audio alert; (3) a usage restriction of the screen area (4) a temperature alert; (5) a modification of a pixel resolution around the particular area (6) a constant indicator, wherein said constant indicator includes one or more of and is not limited to the following: (a) a visual effect that includes a highlighting mechanism facilitated by a display of one or more of icons and arrows on the screen at a location within a preset range of distances to the affected area (b) a touch sensory mechanism that includes one or more of a heating and cooling of an affected screen area when touched by the object; and (c) an audio sensory mechanism that includes a sound that increases in sound level when an object is positioned within a defined proximity of the affected area (7) an application of a transparent film to the screen surface; and (8) a utilization of a wiper mechanism that dispenses cleaning material across the screen surface;
  display a list of maintenance tasks to be completed by a user to execute a maintenance action;
  enable execution of the maintenance action via the displayed list, wherein a user is able to interact with said list to indicate a completion of one or more tasks on the list;
  providing a maintenance action via an external screen protection device, wherein said screen protection device has a blue-tooth capability, which enables communication between the protection device and the electronic device in order to provide an appropriate set of details of the affected area of the screen to the protection device; and
  detect one or more defects in one or more display screen pixels; and
  in response to detecting a defect, trigger a set of maintenance actions based on the defect of the display screen pixels;
wherein a discovery of said defect of the screen pixels is facilitated by one or more maintenance actions which include a cleaning action of the touch screen, wherein said maintenance actions enable an identification of a persistent problem with the screen display, which is not attributable to the level of cleanliness of the screen; and
wherein said defect of the screen pixels is confirmed by a set of results obtained by a test of the screen pixels.

2. The device of claim 1, wherein the SDM utility further configures the device to:
  store data pertaining to the set of characteristics of the object; and
  perform a number of maintenance checks at specific time intervals based on one or more of: (1) a set of configuration data; and (2) a set of data stored in one or more files of maintenance records and results.

3. The device of claim 1, wherein said utility configuring the device to determine further configures the device to:
  identify the set of characteristics of the object with an application of one or more of: (1) a temperature measurement of the object; (2) a weight measurement of the object; (3) a determination of a location of the object on the screen; (4) an image capture of the object; (5) determining a type of the object with an aid of a set of applications which set includes one or more applications based on an object recognition technology; (6) a determination of a set of physical dimensions of the object; (7) a determination of a physical state of the object; (8) a determination of a mobility of the object; (9) a determination of a viscosity of the object; and
  track one or more of a set of dynamic characteristics of the object with an update of values from one or more of said procedures.

4. The device of claim 1, wherein:
said utility configuring the device to includes configuring the device to simultaneously detect multiple objects at one or more areas of the touch screen with the aid of a multi-detection mechanism; and
said utility configuring the device to determine includes configuring the device to determine the set of characteristics of the multiple objects.

5. A computer program product comprising:
a computer readable storage device; and
program code on said computer readable storage device that when executed by a processing device having a touch screen display (touch screen), provides the functions of:
receiving data indicating a detection of an occurrence of a contact by one or more objects with the touch screen;
automatically determining a set of characteristics of the one or more objects following the occurrence of the contact with the touch screen; and
dynamically activating a set of maintenance actions to enhance a level of cleanliness of the touch screen;
displaying a list of maintenance tasks to be completed by a user to execute a maintenance action;
enabling execution of the maintenance action via the displayed list, wherein a user is able to interact with said list to indicate a completion of one or more tasks on the list
providing a maintenance action via an external screen protection device, wherein said screen protection device has a blue-tooth capability, which enables communication between the protection device and the electronic device in order to provide an appropriate set of details of the affected area of the screen to the protection device;
detecting one or more defects in one or more display screen pixels; and
when a defect is detected, triggering a set of maintenance actions based on a defect of the display screen pixels;

wherein a discovery of said defect of the screen pixels is facilitated by one or more maintenance actions which include a cleaning action of the touch screen, wherein said maintenance actions enable an identification of a persistent problem with the screen display, which is not attributable to the level of cleanliness of the screen; and wherein said defect of the screen pixels is confirmed by a set of results obtained by a test of the screen pixels.

6. The computer program product of claim 5, wherein for at least one object of the one or more objects, said program code further comprises code for:

identifying the set of characteristics of the object with an application of one or more of the following procedures: (1) a temperature measurement of the object; (2) a weight measurement of the object; (3) a determination of a location of the object on the screen; (4) an image capture of the object; (5) determining a type of the object with an aid of a set of applications which set includes one or more applications based on an object recognition technology; (6) a determination of a set of physical dimensions of the object; (7) a determination of a physical state of the object; (8) a determination of a mobility of the object; (9) a determination of a viscosity of the object;

tracking one or more of a set of dynamic characteristics of the object with an update of values from one or more of said procedures;

storing data pertaining to the set of characteristics of the object; and performing a number of maintenance checks at a set of specific time intervals based on one or more of the following: (1) a set of configuration data; and (2) a set of data stored in one or more files of maintenance records and results.

7. The computer program product of claim 5, wherein said code for activating further comprises code for:

triggering the set of maintenance actions as a result of one or more of the following factors: (1) a characteristic of a detected object; (2) a threshold level attained following the occurrence of the contact, wherein said threshold is based on one or more factors contained within a maintenance configuration file; (3) an elapsed time interval since a last maintenance action; (4) an identified level of screen cleanliness that is determined by one or more procedures, including utilization of opacity sensors; (5) a time of day; (6) a level of interaction between a user and the touch screen; and (7) a set of configuration data.

8. The computer program product of claim 7, further comprising code for:

applying the set of maintenance actions, including one or more of the following:
(1) a visual change in a particular screen location;
(2) an audio alert;
(3) a usage restriction of the screen area;
(4) a temperature alert;
(5) a modification of a pixel resolution around the particular area; and
(6) a constant indicator, wherein said constant indicator includes one or more of and is not limited to the following: (a) a visual effect that includes a highlighting mechanism facilitated by a display of one or more of icons and arrows on the screen at a location within a preset range of distances to the affected area; (b) a touch sensory mechanism that includes one or more of a heating and cooling of an affected screen area when touched by the object; and (c) an audio sensory mechanism that includes a sound that increases in sound level when an object is positioned within a defined proximity of the affected area;
(7) an application of a transparent film to the screen surface; and
(8) a utilization of a wiper mechanism that dispenses cleaning material across the screen surface.

* * * * *